United States Patent [19]
Raftis

[11] Patent Number: 4,923,166
[45] Date of Patent: May 8, 1990

[54] PRESSURE-REDUCING NOISE-ABATING CONTROL VALVE

[75] Inventor: Spiros G. Raftis, Pittsburgh, Pa.

[73] Assignee: Red Valve Company, Inc., Carnegie, Pa.

[21] Appl. No.: 386,241

[22] Filed: Jul. 28, 1989

[51] Int. Cl.⁵ ............................................. F16K 7/04
[52] U.S. Cl. ......................................... 251/4; 251/127
[58] Field of Search .................. 251/4, 7, 205, 206, 251/118, 127; 138/37, 42, 44, 45

[56] References Cited

U.S. PATENT DOCUMENTS 4,176,683 12/1979 Leibinsohn .................. 251/4 X
4,372,528 2/1983 Raftis ............................ 251/4

Primary Examiner—John Fox
Attorney, Agent, or Firm—Kirschstein, Ottinger, Israel & Schiffmiller

[57] ABSTRACT

A control valve has a plurality of internal flow channels operative for reducing the pressure and attenuating the noise of pressurized fluids being conveyed along a pipe line. An entrance well within the valve minimizes excess turbulence.

10 Claims, 3 Drawing Sheets

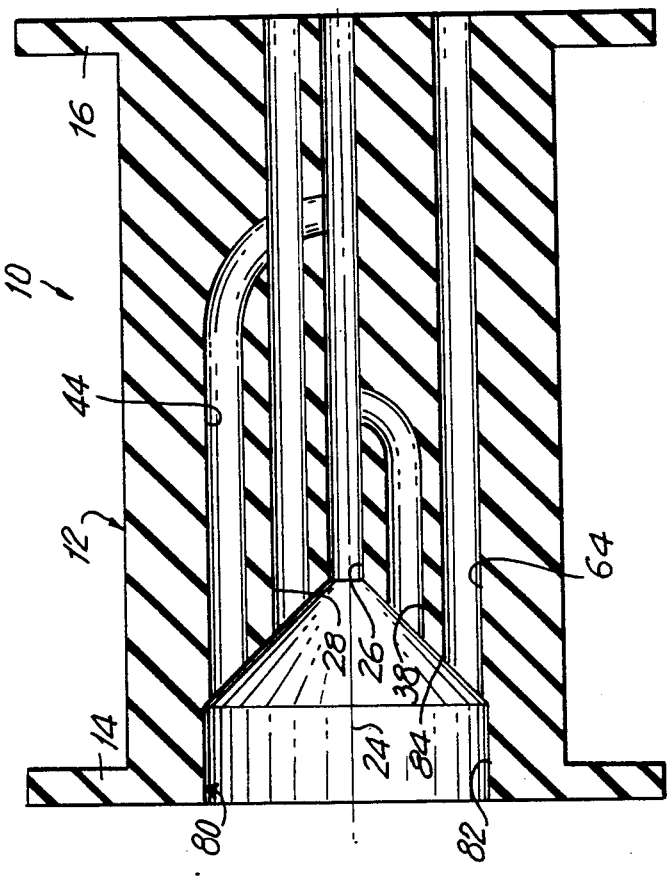

PRESSURE-REDUCING NOISE-ABATING CONTROL VALVE

BACKGROUND OF THE INVENTION

1. Field of the Invention

This invention generally relates to a control valve and, more particularly, to a pinch valve operative for reducing the pressure and attenuating the noise of highly pressurized fluids being conveyed along a pipe line.

2. Description of Related Art

There are many industrial applications in which pipe lines convey highly pressurized fluids. For example, power plants convey steam at elevated pressures on the order of 3000 psi through a pipe line to a steam turbine. Any steam not being used by the turbine is vented to the atmosphere. Unless such elevated pressures of the steam are reduced, a very shrill, deafening sound would be produced by the vented steam.

Typically, a succession of valves are employed to drop the pressure with concomitant noise abatement prior to venting the steam to the environment. Although generally satisfactory, the use of such a large number of valves is very costly and makes for a fairly complicated valve system requiring frequent maintenance.

SUMMARY OF THE INVENTION

1. Objects of the Invention

It is a general object of this invention to overcome the drawbacks of prior art control valve systems.

It is another object of this invention to reduce the pressure and attenuate the noise of highly pressurized fluids in a single control valve of inexpensive and simple construction.

Another object of this invention is to convert a pinch valve to a control valve that effectively abates the noise and reduces the pressure of highly pressurized fluids flowing therethrough.

2. Features of the Invention

In keeping with these objects, and others which will become apparent hereinafter, one feature of this invention resides, briefly stated, in providing a control valve in a pipe line for conveying pressurized fluids, e.g. steam, gas, slurries, liquids, etc. The valve comprises an elongated sleeve having an inlet end and an outlet end for respective connection to an upstream section and a downstream section of the pipe line. The sleeve also has a sleeve body of one piece with, and extending between, the inlet and outlet ends.

The sleeve body has a plurality of internal flow channels, at least some of which extend from the inlet end to the outlet end. The inlet end has a predetermined flow-through cross-section. The flow channels together have a combined effective flow-through cross-section that is less than said predetermined cross-section, and is effective to drop the pressure and attenuate the noise of the pressurized fluids being conveyed from the inlet end to the outlet end of the valve.

In a preferred embodiment, the flow channels include a central channel extending along a center line of the sleeve body, a first group of the flow channels being arranged in a first annulus about the center line and around the central channel, and a second group of the flow channels being arranged in a second annulus about the first annulus and around the first group of flow channels. Preferably, the first group includes a smaller number of flow channels than the second group. The flow channels in each group are equiangularly spaced around the center line.

In another preferred embodiment, the flow channels extend linearly all the way from the inlet end to the outlet end. Alternatively, the flow channels may extend along a waved course from the inlet end to the outlet end. In still another variant, at least one of the flow channels of the first group and of the second group extends into and merges with the central channel prior to reaching the outlet end of the valve.

The sleeve body may be made of metal, but is preferably constituted of a multi-ply elastomeric material such as neoprene, rubber, Viton or butyl hypalon. The sleeve body can also be constituted of Teflon.

The number of plies increases in a radially-outward direction from the center line. In a preferred construction, the valve body includes one ply between the central channel and the first group of flow channels, two plies between the first and second groups of flow channels, and six plies beyond the second group of flow channels.

Due to the elastomeric nature of the material constituting the sleeve body, the latter is preferably positioned between, and engaged by, pinch bars of a pinch valve. The pinch bars are operative for compressing opposite sides of the sleeve body to control the flow of the pressurized fluids therethrough.

In order to reduce the turbulence of the highly pressurized fluids, a tapered well is provided at the inlet end of the sleeve. The well is in communication with all of the flow channels formed in the sleeve body.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a view analogous to FIG. 1, but of still another embodiment of this invention; and FIG. 5 is a sectional view taken on line 5—5 of FIG. 4.

DETAILED DESCRIPTION OF THE PREFERRED EMBODIMENTS

Figure 2:
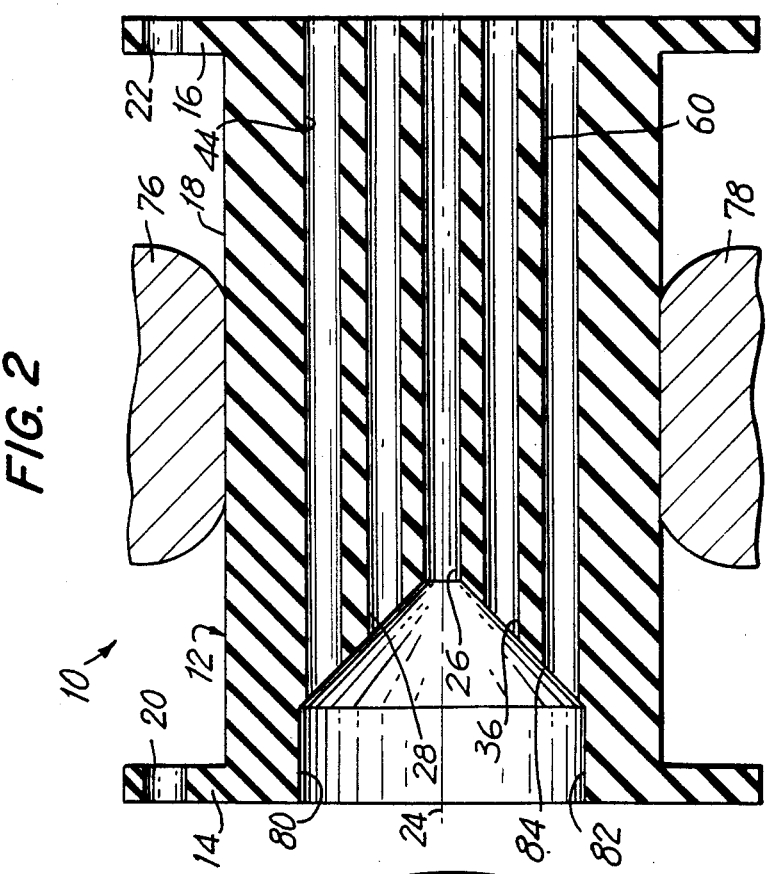
FIG. 2 is a sectional view taken on line 2—2 of FIG. 1.
Figure 1:
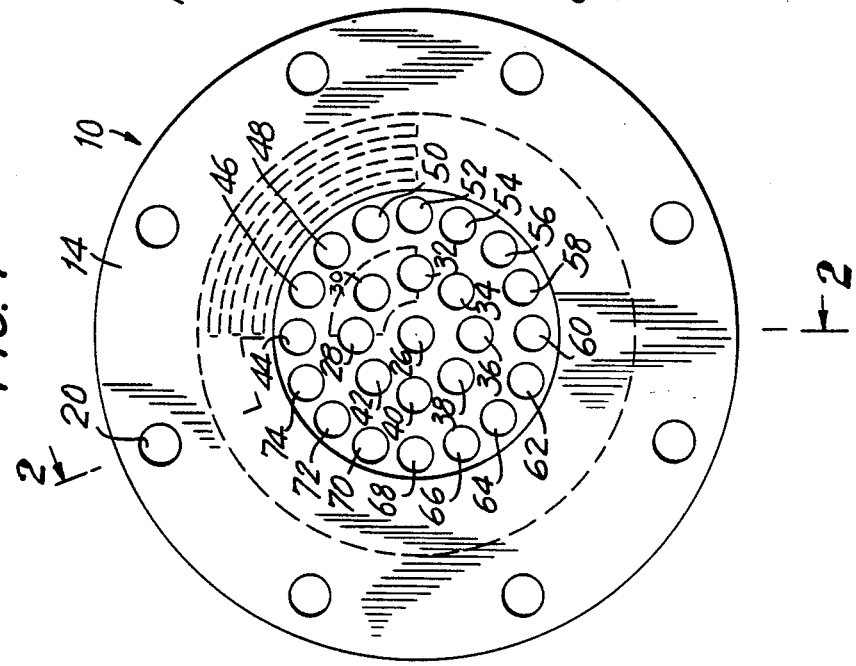
FIG. 1 is an end view of the control valve according to one embodiment of the control valve of this invention.

Referring now to FIGS. 1 and 2 of this invention, reference numeral 10 generally identifies a pressure-reducing noise-attenuating control valve for use in a pipe line operative for conveying pressurized fluids. The valve 10 comprises an elongated sleeve 12 having an inlet end 14 and an outlet end 16 for respective connection to non-illustrated upstream and downstream sections of the pipe line.

The sleeve 12 further includes a cylindrical sleeve body 18 of one piece with, and extending between, the inlet end 14 and the outlet end 16. The inlet end 14 and the outlet end 16 are each formed as a circular flange of greater diameter than that of the body 18. A plurality of equiangularly spaced mounting holes 20 are formed in the flanged inlet end 14 and, together with non-illustrated connectors, e.g. bolts, are connected to the upstream pipe line section. Analogously, a plurality of mounting holes 22 are equiangularly spaced about the flanged outlet end 16 and, together with non-illustrated connectors such as bolts, are connected to a downstream pipe line section.

The cylindrical sleeve body 18 extends along a center line or longitudinal axis 24, and is formed with a plurality of internal flow channels, at least some of which extend from the inlet end 14 to the outlet end 16. As best shown in the FIG. 1 embodiment, the flow channels include a central channel 26 extending along the longitudinal axis 24, a first group of flow channels 28–42 arranged in a first circular annulus about the axis 24, and a second group of flow channels 44–74 arranged in a second circular annulus about the axis 24. The first group of flow channels advantageously comprises eight channels which are equiangularly spaced about the axis 24. The second group advantageously comprises sixteen flow channels which are equiangularly spaced about the axis 24. The second group is located at a greater radial distance from the axis 24 as compared to the first group of flow channels.

Figure 3:
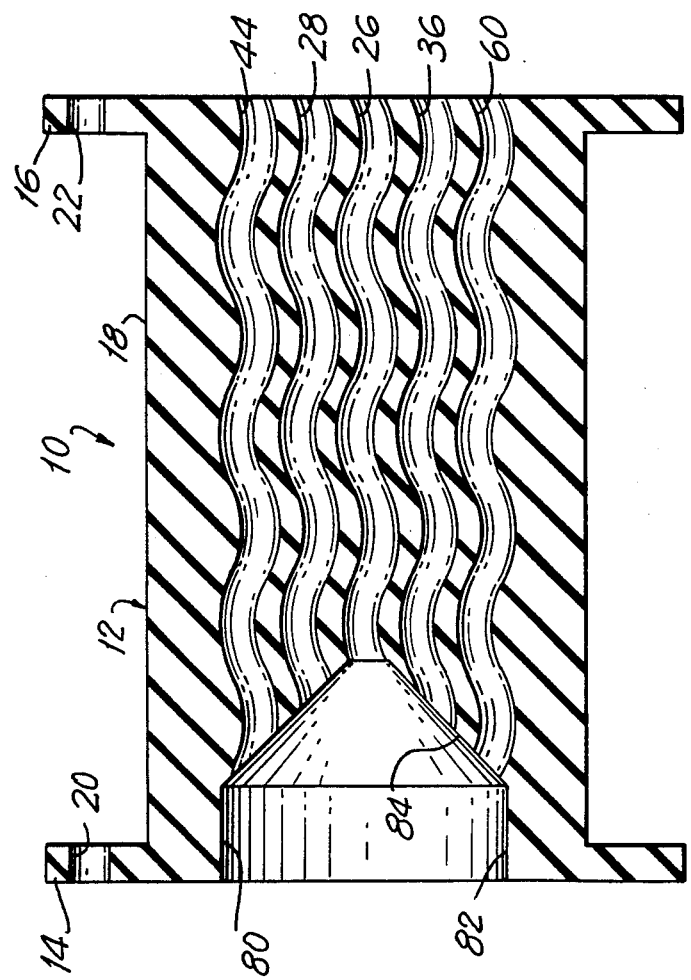
FIG. 3 is a view analogous to FIG. 2, but of another embodiment of this invention.

As best shown in FIG. 2, the first embodiment has all of its flow channels extending linearly from the inlet end 14 to the outlet end 16. As shown in the embodiment of FIG. 3, all of the flow channels extend along a waved or corrugated course from the inlet end 14 to the outlet end 16. As shown in the embodiment of FIGS. 4 and 5, at least one of the flow channels of the first group, e.g. channel 38, extends into and merges with the central channel 26 prior to reaching the outlet end 16. In addition, at least one of the flow channels of the second group, e.g. channel 44, extends into and merges with the central channel 26 prior to reaching the outlet end 16.

By causing several of the flow channels to merge with the central channel prior to reaching the outlet end, additional material constituting the sleeve body is positioned between the respective flow channels and the outlet end, thereby providing increased material or "meat" to better withstand valve wear.

The sleeve is preferably constituted of a multi-ply elastomeric material such as rubber, neoprene, butyl hypalon or Viton. Teflon can also be used. When used for flow control, metal can also be used as the sleeve material.

The number of plies of elastomeric material preferably increases in a radially-outward direction from the axis 24. Thus, in a preferred embodiment, at least one ply is located between the central channel 26 and the first group of channels, at least two plies are located between the first and the second groups of channels, and at least six plies are located beyond the second group of channels.

Returning to FIG. 1, a set of pinch bars 76, 78 engage opposite sides of the sleeve body which, in this embodiment, is made of an elastomeric compressible material. In pinch valve operation, at least one of the pinch bars 76, 78, if not both, moves toward and away from the other, thereby controlling the flow of fluid through the valve.

Still another feature of this invention lies in the provision of an entrance well 80 at the inlet end 14. The well 80 has an upstream cylindrical bore section 82, and a tapered section 84 which converges toward the central channel 26. The downstream end of the well 80 is in communication with all of the flow channels, and serves to reduce the turbulence encountered when the highly pressurized fluids initially enter the sleeve.

In all of the embodiments, the flow channels present a combined effective flow-through cross-section which is less than the cross-section of the well 80. This causes the pressure of the fluids entering the valve to drop with concomitant noise attenuation as the pressurized fluids pass between the inlet and outlet ends of the valve.

It will be understood that each of the elements described above, or two or more together, also may find a useful application in other types of constructions differing from the types described above.

While the invention has been illustrated and described as embodied in a pressure-reducing noise-abating control valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a pipe line for conveying pressurized fluids, a pressure-reducing, noise-attenuating control valve, comprising: an elongated sleeve having an inlet end and an outlet end for respective connection to an upstream section and a downstream section of the pipe line, and a sleeve body of one piece with, and extending between, the inlet end and the outlet end, said sleeve body having a plurality of internal flow channels, at least some of which extend from the inlet end to the outlet end, said inlet end having a predetermined flow-through cross-section, and said flow channels having a combined effective flow-through cross-section less than said predetermined cross-section to drop the pressure and attenuate the noise of the pressurized fluids between the inlet end and the outlet end of the valve.

2. The control valve according to claim 1, wherein the flow channels include a central channel extending along a center line of the sleeve body, a first group of said flow channels arranged in a first annulus and equiangularly spaced about the center line around the central channel, and a second group of said flow channels arranged in a second annulus and equiangularly spaced about the first annulus around the first group of flow channels.

3. The control valve according to claim 2, wherein all of the flow channels extend linearly from the inlet end to the outlet end.

4. The control valve according to claim 2, wherein all of the flow channels extend along a waved course from the inlet end to the outlet end.

5. The control valve according to claim 2, wherein at least one of the flow channels of the first group and of the second group extends into, and merges with, the central channel.

6. The control valve according to claim 2, wherein the sleeve body is constituted of a multi-ply elastomeric material.

7. The control valve according to claim 6, wherein the number of plies increases in a radially outward direction from the center line.

8. The control valve according to claim 6, wherein the sleeve body is compressible and has opposite sides engageable with pinch bars of a pinch valve.

9. The control valve according to claim 1; and further comprising an entrance well at the inlet end, said well being in communication with the internal flow channels.

10. The control valve according to claim 9, wherein said well includes a cylindrical bore section and a tapered section which converges in the downstream direction.

* * * * *